US009274615B2

(12) United States Patent
Lam et al.

(10) Patent No.: US 9,274,615 B2
(45) Date of Patent: Mar. 1, 2016

(54) INTERACTIVE INPUT SYSTEM AND METHOD

(71) Applicant: PixArt Imaging Inc., Hsin-Chu (TW)

(72) Inventors: Clinton Lam, Calgary (CA); Lawrence Bruce Hewitt, Calgary (CA); Trevor Akitt, Calgary (CA); Charles Ung, Calgary (CA)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 415 days.

(21) Appl. No.: 13/675,510

(22) Filed: Nov. 13, 2012

(65) Prior Publication Data
US 2013/0120252 A1  May 16, 2013

Related U.S. Application Data

(60) Provisional application No. 61/558,961, filed on Nov. 11, 2011.

(51) Int. Cl.
*G06F 3/033* (2013.01)
*G06F 3/041* (2006.01)
*G06F 3/042* (2006.01)

(52) U.S. Cl.
CPC .............. *G06F 3/033* (2013.01); *G06F 3/042* (2013.01); *G06F 3/0416* (2013.01); *G06F 3/0425* (2013.01); *G06F 3/0428* (2013.01)

(58) Field of Classification Search
CPC ....... G06F 3/033; G06F 3/042; G06F 3/0428; G06F 3/0425; G06F 3/03545; G06F 3/005
USPC .................. 345/157, 156, 173, 175
See application file for complete search history.

(56) References Cited

U.S. PATENT DOCUMENTS

| 5,448,263 | A  | 9/1995  | Martin |
| 6,141,000 | A  | 10/2000 | Martin |
| 6,337,681 | B1 | 1/2002  | Martin |
| 6,747,636 | B2 | 6/2004  | Martin |
| 6,803,906 | B1 | 10/2004 | Morrison et al. |
| 7,232,986 | B2 | 6/2007  | Worthington et al. |
| 7,236,162 | B2 | 6/2007  | Morrison et al. |
| 7,274,356 | B2 | 9/2007  | Ung et al. |
| 2004/0179001 | A1 | 9/2004 | Morrison et al. |

(Continued)

FOREIGN PATENT DOCUMENTS

WO    2010/028490 A1    3/2010

OTHER PUBLICATIONS

Transmittal; International Search Report; and Written Opinion of the International Searching Authority for International Application No. PCT/CA2012/001031 with a mailing date of Feb. 13, 2013.

*Primary Examiner* — Fred Tzeng
(74) *Attorney, Agent, or Firm* — Winston Hsu; Scott Margo

(57) ABSTRACT

An interactive input system comprises at least two imaging assemblies capturing image frames of a region of interest from different vantages, each imaging assembly comprising an image sensor and signal processing circuitry implemented on an application specific integrated circuit (ASIC), image data acquired by the image sensor being pre-processed by the signal processing circuitry; and processing structure processing pre-processed image data output by the imaging assemblies to determine the location of at least one pointer within the region of interest.

41 Claims, 11 Drawing Sheets

(56) References Cited

U.S. PATENT DOCUMENTS

| | | |
|---|---|---|
| 2005/0248539 A1 | 11/2005 | Morrison et al. |
| 2009/0278795 A1* | 11/2009 | Hansen et al. ............... 345/156 |
| 2011/0032216 A1* | 2/2011 | Hos .................... G06F 3/042 |
| | | 345/175 |
| 2011/0095977 A1* | 4/2011 | Ung ..................... G06F 3/0428 |
| | | 345/158 |
| 2011/0095989 A1* | 4/2011 | McGibney ........ G06F 3/03545 |
| | | 345/173 |
| 2011/0169736 A1 | 7/2011 | Bolt et al. |
| 2011/0221706 A1 | 9/2011 | McGibney et al. |
| 2011/0241984 A1* | 10/2011 | Morrison et al. ............ 345/157 |
| 2011/0242006 A1* | 10/2011 | Thompson et al. .......... 345/173 |
| 2011/0242060 A1* | 10/2011 | McGibney ......... G06F 3/03545 |
| | | 345/179 |
| 2012/0007804 A1* | 1/2012 | Morrison ............... G06F 3/005 |
| | | 345/158 |
| 2012/0249477 A1* | 10/2012 | Popovich et al. ............ 345/175 |
| 2012/0249480 A1* | 10/2012 | Keenan ................ G06F 3/0428 |
| | | 345/175 |
| 2012/0250936 A1* | 10/2012 | Holmgren .................... 382/103 |
| 2013/0234990 A1* | 9/2013 | Wang et al. .................. 345/175 |

\* cited by examiner

INTERACTIVE INPUT SYSTEM AND METHOD

CROSS-REFERENCE TO RELATED APPLICATION

This application claims the benefit of U.S. Provisional Application No. 61/558,961 to Thompson et al. filed on Nov. 11, 2011, entitled "Interactive Input System and Method", the entire disclosure of which is incorporated herein by reference.

BACKGROUND OF THE INVENTION

The present invention relates to an interactive input system and method and to an imaging assembly therefor.

BACKGROUND OF THE INVENTION

Interactive input systems that allow users to inject input into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the entire disclosures of which are incorporated by reference; touch systems comprising touch panels employing electromagnetic, capacitive, acoustic or other technologies to register pointer input; tablet and laptop personal computers (PCs); smartphones, personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

International PCT Patent Application Publication No. WO 2010/028490 to McGibney et al., assigned to SMART Technologies ULC, discloses a touch input system comprising at least two imaging assemblies capturing image frames of a region of interest from different vantages. Each imaging assembly comprises an image sensor and integrated signal processing circuitry. The integrated signal processing circuitry is implemented on a field programmable gate array (FPGA), a digital signal processor (DSP) or an application specific integrated circuit (ASIC). The integrated signal processing circuitry comprises a spotlight processor and a bezel processor to pre-process image data acquired by the associated image sensor and generate pointer data, and pointer hover and contact status data.

Although a variety of interactive input system exists, in many cases, the interactive input systems employ off-the-shelf components. Unfortunately, these off-the-shelf components tend to be large in size, expensive and power inefficient. This of course increases interactive input system manufacturing and operating costs. In addition, in interactive input systems employing multiple processors that communicate over communication links, the designs of the processor circuitry and communication links have limited processing and communication speed causing latency issues. As will be appreciated, improvements in interactive input system design are desired.

It is therefore an object of the present invention to provide a novel interactive input system and method and a novel imaging assembly therefor.

SUMMARY OF THE INVENTION

Accordingly, in one aspect there is provided an interactive input system comprising: at least two imaging assemblies capturing image frames of a region of interest from different vantages, each imaging assembly comprising an image sensor and signal processing circuitry implemented on an application specific integrated circuit (ASIC), image data acquired by said image sensor being pre-processed by said signal processing circuitry; and processing structure processing pre-processed image data output by said imaging assemblies to determine the location of at least one pointer within the region of interest.

In one embodiment, the processing structure comprises a plurality of digital signal processors and an image data concentrator. The image data concentrator combines pre-processed image data received from the imaging assemblies into an image data stream and communicates the image data stream to one of the digital signal processors. The one digital signal processor processes the pre-processed image data to generate pointer data and another of the plurality of digital signal processors receives the pointer data from the one digital signal processor and triangulates the pointer data to determine the location of the at least one pointer in (x,y) coordinates relative to an interactive surface.

In one embodiment, each imaging assembly captures image frames in an image frame sequence and wherein the signal processing circuitry processes the image frames of the image frame sequence thereby to generate the pre-processed image data. In one form, the signal processing circuitry processes image frames to remove ambient light artifacts, to identify regions of interest therein representing potential pointers and to determine the identity of an active pointer.

In one embodiment, the processing structure is configured to provide configuration data to the imaging assemblies. The configuration data specifies a window of pixels in the captured image frames forming the image data to be pre-processed.

According to another aspect there is provided an imaging assembly for an interactive input system comprising an image sensor having a field of view looking into a region of interest; and processing circuitry receiving image data acquired by said image sensor and processing the image data, wherein said image sensor and processing circuitry are implemented on an application specific integrated circuit (ASIC).

According to another aspect there is provided an interactive input system comprising at least two imaging assemblies having a fields of view encompassing a region of interest from different vantages, each imaging assembly capturing a sequence of image frames, one image frame being captured when the region of interest is flooded with illumination and a plurality of image frames being captured in the absence of the illumination, each imaging assembly having signal processing circuitry generating difference image data using said one image frame and a background image frame captured in the absence of the illumination and performing vertical intensity calculations using the difference image data and the background image thereby to identify one or more potential pointers; and processing structure processing the output of said imaging assemblies to determine the location of each pointer within the region of interest.

According to another aspect there is provided an interactive input system comprising at least two imaging assemblies capturing image frames of a region of interest that is surrounding by a bezel from different vantages, each imaging assembly processing image data within a window of the captured image frames, the window having a shape generally conforming to the shape of the bezel as it appears in the captured image frames; and processing structure processing the image data output by the imaging assemblies to determine the location of at least one pointer within the region of interest.

According to another aspect there is provided an imaging assembly for an interactive input system comprising an image sensor having a field of view looking into a region of interest; and processing circuitry processing a sequence of image frames captured by the image sensor, one image frame being captured when the region of interest is flooded with backlight illumination and a plurality of image frames being captured in the absence of the backlight illumination, said processing circuitry generating difference image data using said one image frame and a background image captured in the absence of the backlight illumination and performing vertical intensity profile calculations using the difference image data and the background image thereby to identify one or more potential pointers in the image frames.

According to another aspect there is provided an imaging assembly for an interactive input system comprising an image sensor having field of view looking into a region of interest and configured to capture image frames thereof; and processing circuitry processing a window of pixels of said image frames to identify one or more potential pointers therein, wherein said window has a shape generally resembling the shape of a bezel surrounding said region of interest as it appears in said captured image frames.

BRIEF DESCRIPTION OF THE DRAWINGS

Embodiments will now be described more fully with reference to the accompanying drawings in which.

DETAILED DESCRIPTION OF THE EMBODIMENTS

Figure 1:
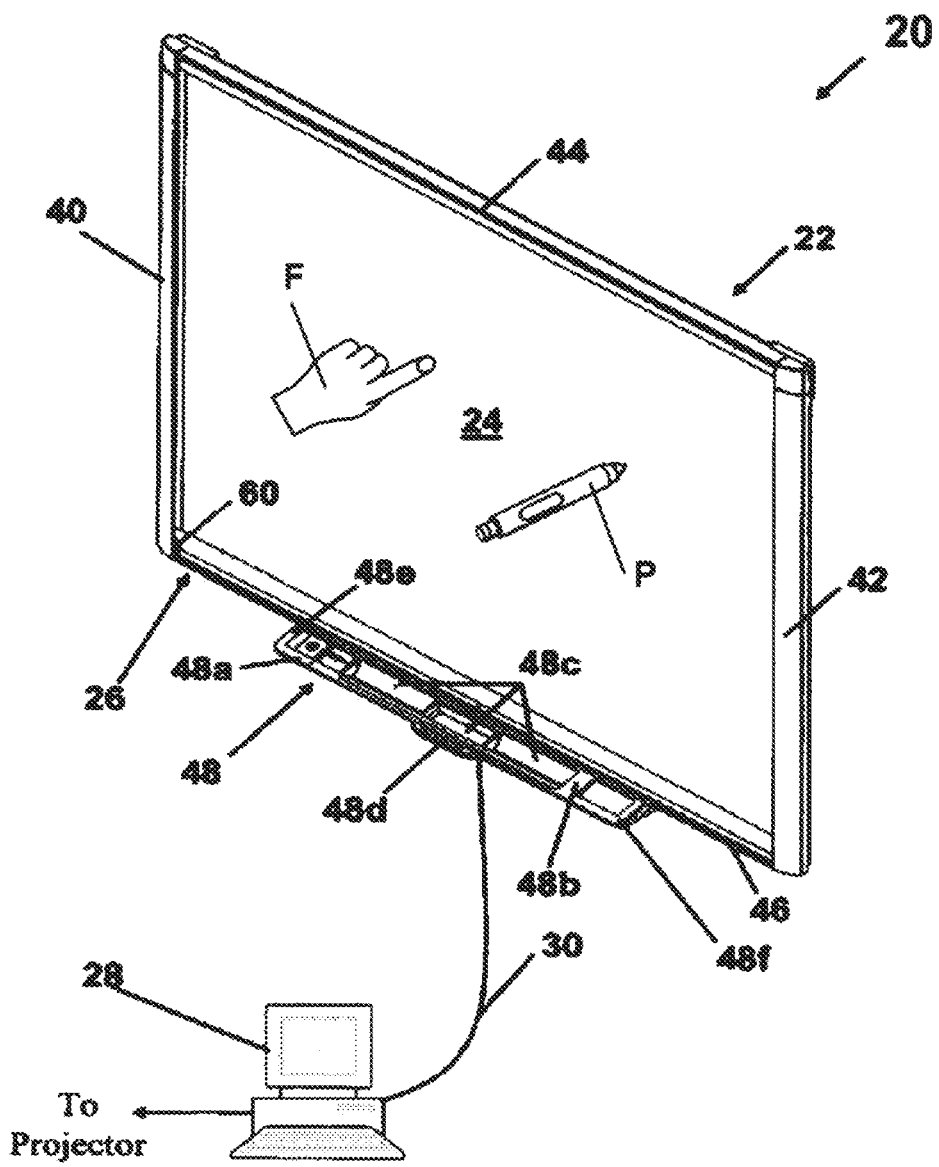
FIG. 1 is a schematic perspective view of an interactive input system.
Figure 2:
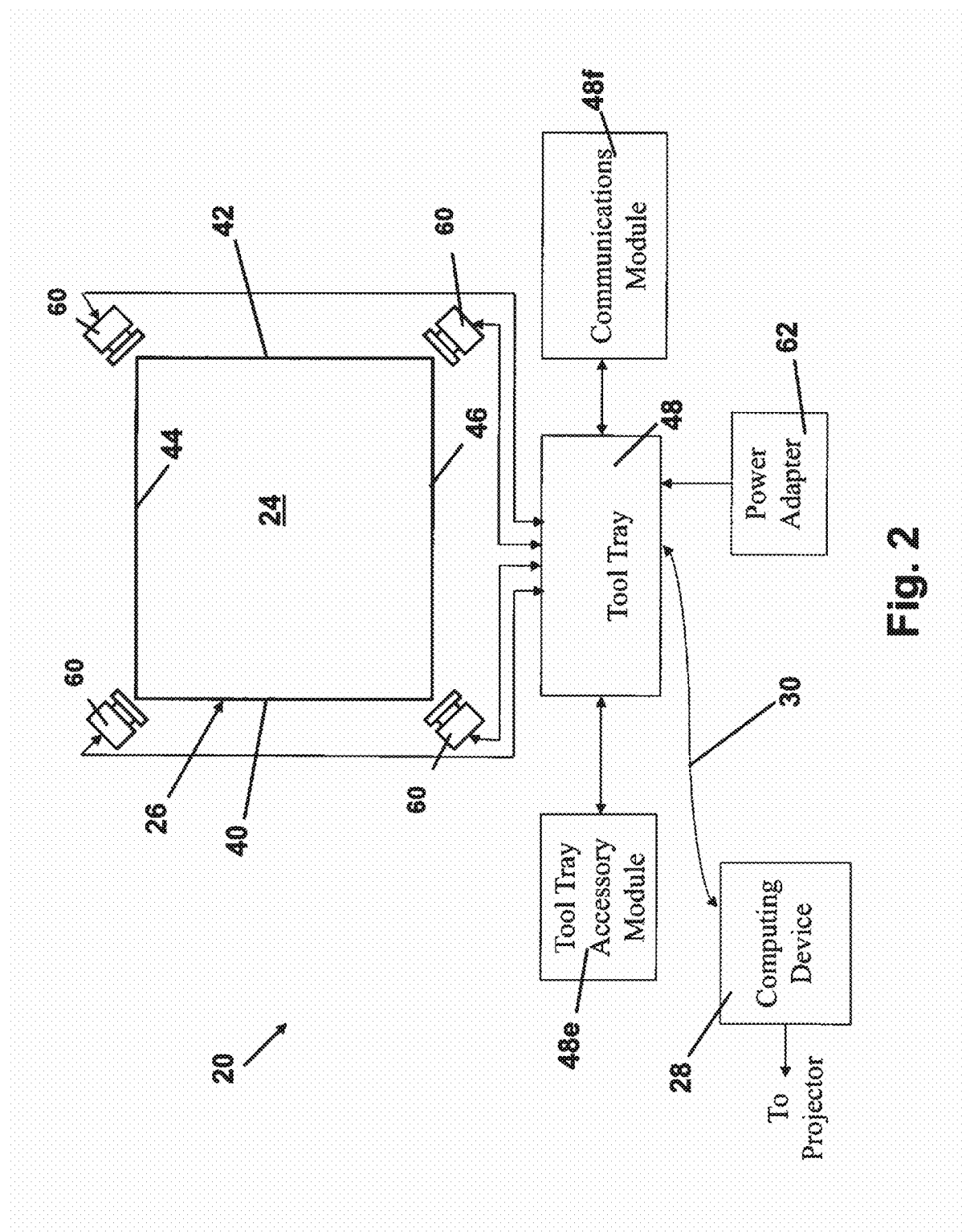
FIG. 2 is a schematic block diagram view of the interactive input system of FIG. 1.

Turning now to FIGS. 1 and 2, an interactive input system that allows a user to inject input such as digital ink, mouse events etc. into an executing application program is shown and is generally identified by reference numeral 20. In this embodiment, interactive input system 20 comprises an interactive board 22 mounted on a vertical support surface such as for example, a wall surface or the like or otherwise supported in a generally upright orientation. Interactive board 22 comprises a generally planar, rectangular interactive surface 24 that is surrounded about its periphery by a bezel 26. An ultra-short throw projector (not shown) such as that sold by SMART Technologies ULC under the name SMART UX60 is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless communication link. General purpose computing device 28 processes the output of the interactive board 22 and adjusts image data that is output to the projector (not shown), if required, so that the image presented on the interactive surface 24 reflects pointer activity. In this manner, the interactive board 22, general purpose computing device 28 and projector (not shown) allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44, 46. Bezel segments 40 and 42 extend along opposite side edges of the interactive surface 24 while bezel segments 44 and 46 extend along the top and bottom edges of the interactive surface 24, respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 is affixed to the interactive board 22 adjacent the bezel segment 46 using suitable fasteners such as for example, screws, clips, adhesive etc. As can be seen, the tool tray 48 comprises a housing 48a having an upper surface 48b configured to define a plurality of receptacles or slots 48c. The receptacles 48c are sized to receive one or more pen tools P as well as an eraser tool (not shown) that can be used to interact with the interactive surface 24. Control buttons 48d are provided on the upper surface 48b of the housing 48a to enable a user to control operation of the interactive input system 20. One end of the tool tray 48 has an expansion port configured to receive a detachable tool tray accessory module 48e while the opposite end of the tool tray 48 has an expansion port configured to receive a detachable communications module 48f for remote device communications. The housing 48a accommodates a master controller 50 (see FIGS. 4 and 5). Further specifics of the tool tray 48 are described in commonly assigned U.S. Patent Application Publication No. 2011/0169736 to Bolt et al. filed on Feb. 19, 2010 and entitled "Interactive Input System and Tool Tray Therefor", the disclosure of which is incorporated herein by reference in its entirety. A power adapter 62 provides the necessary operating power to the interactive board 22 when connected to a conventional AC mains power supply.

Imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as a user's finger F, a cylinder or other suitable object, a pen tool P (passive or active) or an eraser tool lifted from a receptacle 48c of the tool tray 48, that is brought into proximity of the interactive surface 24 appears in the fields of view of the imaging assemblies 60 and thus, is captured in image frames acquired by the imaging assemblies 60.

Figure 3:
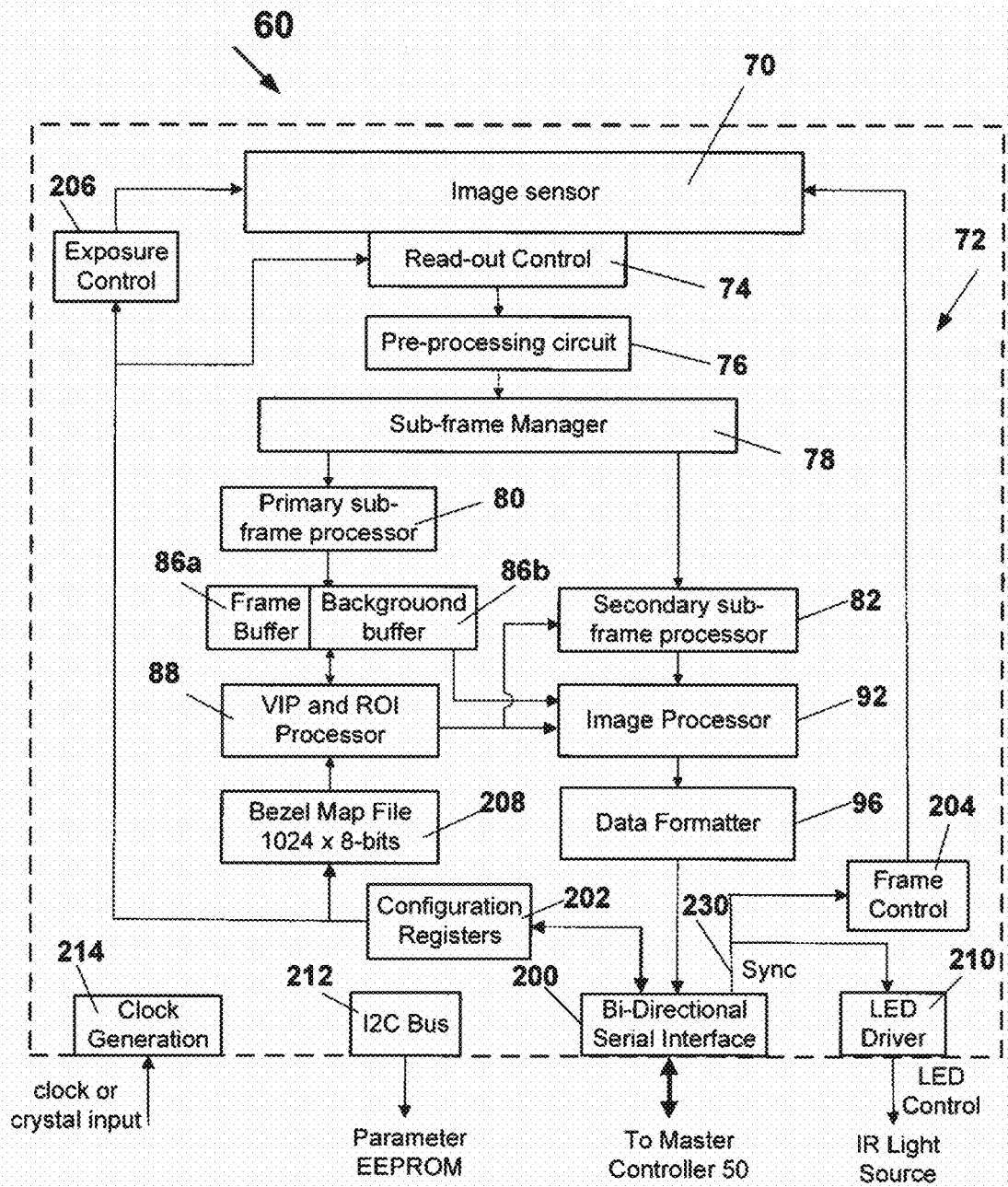
FIG. 3 is a block diagram of one of the imaging assemblies forming part of the interactive input system of FIG. 1.

Turning now to FIG. 3, one of the imaging assemblies 60 is better illustrated. As can be seen, the imaging assembly 60 comprises an image sensor 70 and associated signal processing circuitry 72. The image sensor 70 and signal processing circuitry 72 are implemented on a single application specific integrated circuit (ASIC). In this embodiment, the image sensor 70 has a resolution of 1024×150 pixels and is fitted with a two element, glass lens having an IR pass filter thereon (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A read-out control 74 communicates with the image sensor 70 and with a pre-processing circuit 76 that communicates with a sub-frame manager 78. Sub-frame manager 78 communicates with both a primary sub-frame processor 80 and a secondary sub-frame processor 82 over parallel paths. The primary sub-frame processor 80 communicates with a frame buffer 86a and a background buffer 86b. The frame and background buffers 86a and 86b respectively communicate with a vertical intensity profile (VIP) and region of interest (ROI) processor 88 which in turn communicates with the secondary sub-frame processor 82, an image processor 92 and a bezel map 208. The bezel map 208 stores a bezel file that defines a starting column, a starting row and a pixel area used during VIP calculations. Image processor 92 also communicates with the secondary sub-frame processor 82 and the background buffer 86b as well as with a data formatter 96. Data formatter 96 communicates with a bi-directional serial interface 200 to which the master controller 50 is coupled. Bi-directional serial interface 200 also communicates with configuration registers 202, a frame control 204 that is coupled to the image sensor 70 and a light emitting diode (LED) driver 210 that drives an infrared (IR) light source, comprising one or more IR LEDs, associated with the imaging assembly 60. The configuration registers 202 communicate with the bezel map 208, the read-out control 74 and an exposure control 206 that is coupled to the image sensor 70. The imaging assembly 60 further comprises an I2C bus interface 212 and a clock generator 214. The I2C bus interface 212 communicates with a parameter EEPROM (not shown) that stores system parameters, such as lens and image sensor calibration data, serial number etc. The clock generator 214 generates all clocks required by the ASIC, for example pixel clock rates from 20 MHz to 45 MHz. The clock generator 214 supports external clock input and also enables the use of an external crystal.

Figure 4:
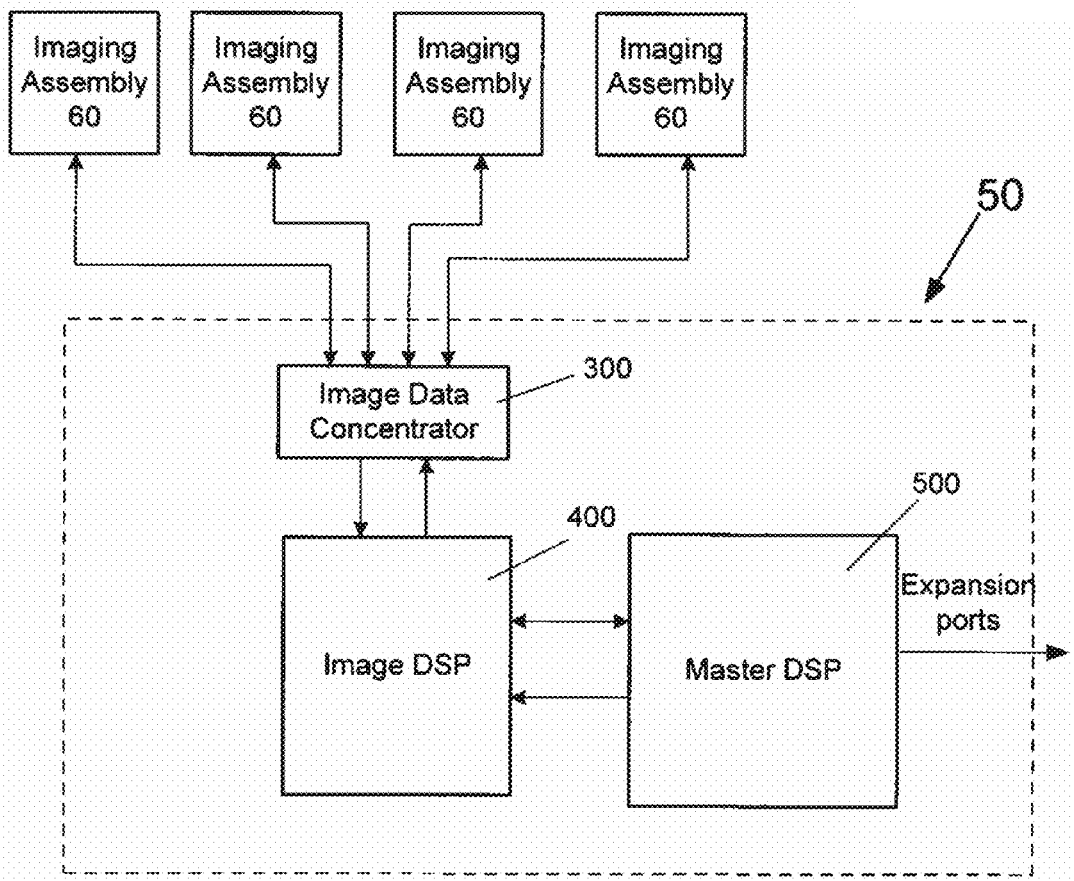
FIG. 4 is a block diagram showing the imaging assemblies and a master controller forming part of the interactive input system of FIG. 1.
Figure 5:
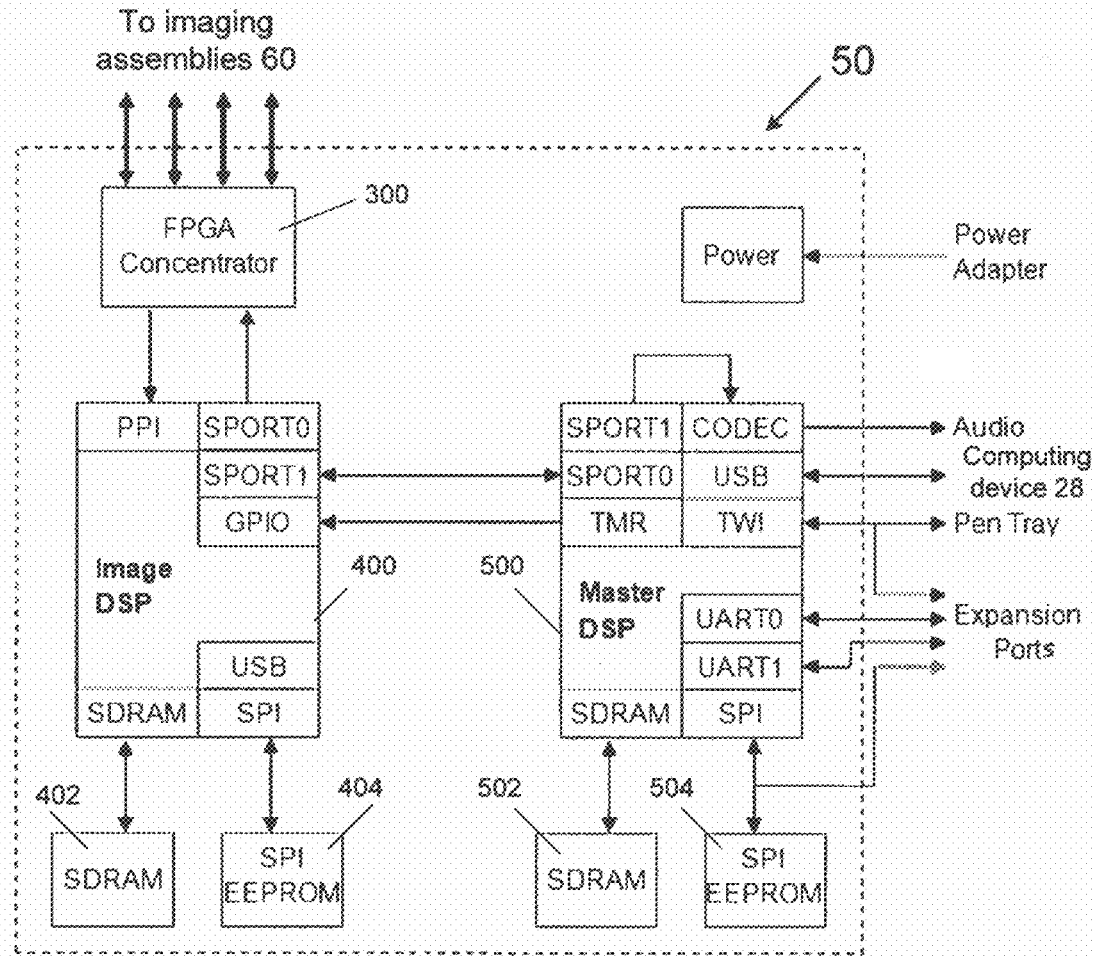
FIG. 5 is a block diagram of the master controller of FIG. 4.

Turning now to FIGS. 4 and 5, the master controller 50 is better illustrated. As can be seen, the master controller 50 comprises three (3) major components, namely an image data concentrator 300, an image digital signal processor (DSP) 400 and a master DSP 500. The image data concentrator 300 in this embodiment is implemented on a field programmable gate array (FPGA) and provides a low voltage differential signalling (LVDS) interface to the imaging assemblies 60.

The image DSP 400 comprises a plurality of ports, namely a parallel port PPI, a serial port SPORT0, a bi-directional serial port SPORT1, a GPIO port, a USB port, a serial peripheral interface (SPI) port and an SDRAM port. The image DSP 400 communicates with image data concentrator 300 via parallel port PPI and serial port SPORT0. The image DSP 400 communicates with the master DSP 500 over the bidirectional serial port SPORT1. GPIO port receives system timing signals generated by the master DSP 500. The SDRAM port connects the image DSP 400 to synchronous dynamic random access memory (SDRAM) 402 that stores temporary data necessary for the image DSP 400. The SPI port is connected to a serial peripheral interface non-volatile storage (SPI EEPROM) 404 that stores the firmware required for the image DSP 400.

The master DSP 500 has an architecture similar to that of the image DSP 400. Master DSP 500 comprises a plurality of ports, namely a serial port SPORT1, a bi-directional serial port SPORT1, a timer port TMR, an SDRAM port, a serial peripheral interface (SPI) port, serial interfaces UART1 and UART2, a TWI port, a USB port and a codec port. Bi-directional serial port SPORT0 of the master DSP 500 is connected to the serial port SPORT1 of the image DSP 400. Timer port TMR provides the timing signals to the GPIO port of the image DSP 400. Serial port SPORT1 of the master DSP 500 is configured to provide digital audio data to the codec port for conversion into stereo analog audio signals that can be sent to a peripheral audio system (not shown). The SDRAM port of the master DSP 500 is connected to an SDRAM 502 that stores temporary data necessary for the master DSP 500. SPI port of the master DSP is connected to an SPI EEPROM 504 that stores the firmware required for the master DSP 500, as well as for modules detachably connected to the expansion ports of the tool tray 48. The serial interfaces UART0 and UART 1 allow the master DSP 500 to communicate with the modules detachably connected to the expansion ports of the tool tray 48. Serial interface TWI is compatible with the I2C protocol and is used to communicate with the tool tray 48, as well as with the modules detachably connected to the expansion ports of the tool tray 48. USB port receives the USB cable 30 allowing the master DSP 500 to communicate with the general purpose computing device 28.

The general purpose computing device 28 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computing device components to the processing unit. The general purpose computing device 28 may also comprise a network connection to access shared or remote drives, one or more networked computers, or other networked devices.

During initialization of the interactive input system 20, the master DSP 500 outputs configuration data to the image DSP 400 via serial ports SPORT0 and SPORT1 which in turn is conveyed to the image data concentrator 300 via serial port SPORT0. The image data concentrator 300 outputs the configuration data to each of the imaging assemblies 60. The configuration data is received by each imaging assembly 60 via its bi-directional serial interface 200 and is used to populate its configuration registers 202. The configuration data in the configuration registers 202 is used by each imaging assembly 60 to control image frame exposure, image frame readout and to update the bezel file stored in bezel map 208.

During operation of the interactive input system 20, the master DSP 500 outputs synchronization signals via its timer port TMR that are received by the image DSP 400 via the GPIO port. The synchronization signals in turn are conveyed to the image data concentrator 300 via serial port SPORT0. The image data concentrator 300 outputs the synchronization signals to the imaging assemblies 60. The synchronization signals are received by each imaging assembly 60 via its bi-directional serial interface 200.

At each imaging assembly 60, the synchronization signals are applied to the frame control 204. In response, the frame control 204 conditions the image sensor 70 to a snapshot mode and to capture sequences of image frames at a frame rate determined by the synchronization signals. In this embodiment, the frame rate is ten (10) times greater than the rate at which the imaging assembly 60 provides output image data to the master controller 50. In particular, in this embodiment the frame rate of each image sensor 70 is equal to 1200 Hz and the master controller 50 processes image data received from the imaging assemblies 60 at a rate equal to 120 Hz. Those of skill in the art will however appreciate that different frame rates and image data processing rates may be employed. The exposure control 206 in accordance with exposure configuration data in the configuration registers 202 provides output to the image sensor 70 to control the exposure time of the image sensor 70 during image frame capture.

In this embodiment, each sequence of image frames comprises ten (10) image frames. The synchronization signals are applied to the LED driver 210 causing the LED driver 210 to condition the IR light source to an on state so that it illuminates and floods the region of interest over the interactive surface 24 with IR illumination during acquisition of the first image frame in the image frame sequence and to condition the IR light source to an off state during acquisition of the second image frame in the image frame sequence. The IR light source also remains in the off state during acquisition of the third to tenth image frames in the image frame sequence.

During image frame capture, if the IR light source associated with imaging assembly 60 is conditioned to the on state, when no pointer exists within the field of view of the imaging assembly, the imaging assembly 60 sees the illumination reflected by the retro-reflective bands on the bezel segments and captures an image frame comprising a continuous bright band on a dark background. When a passive pointer exists within the field of view of the imaging assembly 60 and the IR light source is on, the pointer occludes reflected IR illumination and appears as a dark region interrupting the bright band in the captured image frame. When the IR light source is off, if no pointer or if a passive pointer is in the field of view of the imaging assembly, the imaging assembly 60 captures a dark image frame. When an active pointer exists within the field of view of the imaging assembly 60 and the IR light source is on, the imaging assembly 60 sees the IR illumination reflected by the retro-reflective bands on the bezel segments and the IR illumination emitted by the active pointer and captures an image frame comprising a continuous bright band on a dark background. When an active pointer exists within the field of view of the imaging assembly 60 and the IR light source is off, the active pointer appears in the captured image frame as a bright region on a dark background.

Figure 13:
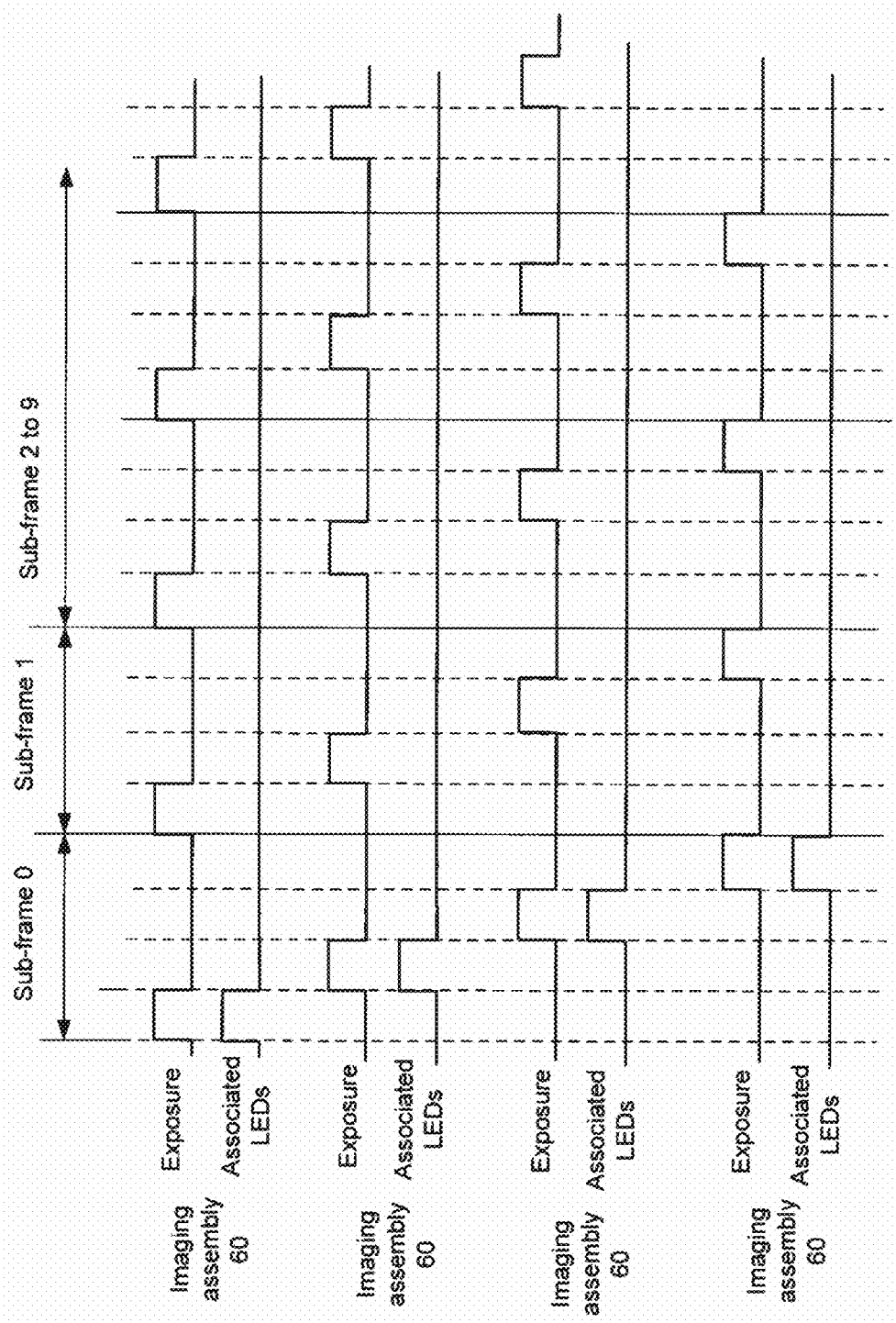
FIG. 13 is a graphical plot of image frame capture sequences used by the interactive input system of FIG. 1.

FIG. 13 shows a portion of image capture sequences for all four (4) imaging assemblies 60. Each imaging assembly 60 continuously captures image frames that are grouped into image frame sequences, with each image frame sequence comprising ten (10) image frames. As mentioned previously, for each imaging assembly 60, the first image frame is acquired with its associated IR light source on. The following nine (9) image frames are acquired with its associated IR light source off. To avoid any effects resulting from illumination of neighbouring IR light sources, the exposure of the image sensors 70 of the four (4) imaging assemblies 60 are staggered such that only one imaging assembly 60 captures an image frame at a given time. Similarly, illumination of the IR light sources are staggered and synchronized with their associated image sensors 70.

Once an image frame has been captured by the image sensor 70 of an imaging assembly 60, image data of the captured image frame is readout by the read-out control 74. Rather than reading image data from the pixel array of image sensor 70 in a horizontal direction, the read-out control 74 reads image data from the pixel array of the image sensor 70 column-by-column in a vertical direction. Reading the image data from the pixel array of the image sensor 70 in a column-wise direction simplifies the implementation of downstream image data processing. The read-out control 74 also only reads a subset or window of pixels from the pixel array of the image sensor 70 in accordance with window configuration data stored in the configuration registers 202 so that substantially only pixels with useful image data are read-out.

Figure 6:
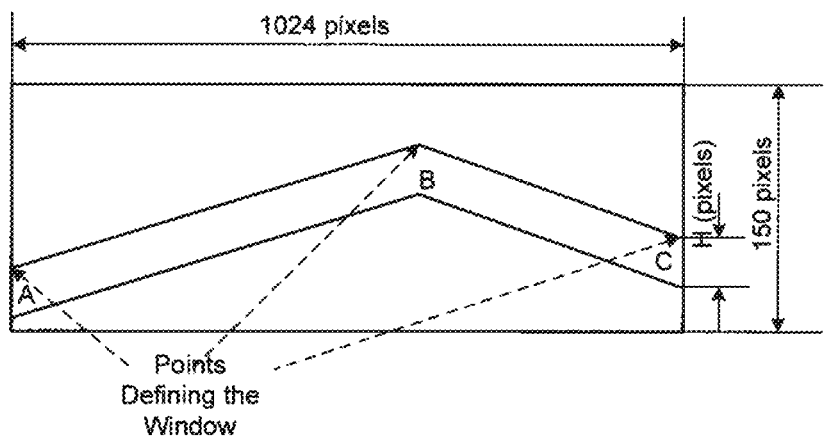
FIG. 6 is a diagram of the pixel area of an image sensor forming part of the imaging assembly of FIG. 3 and a window of the pixel area that is read out.

In this embodiment, the read-out control 74 reads image data from pixels of the pixel array within a window that has a shape generally resembling a chevron and that conforms to the shape of the bezel as it appears in captured image frames. The pixels of the pixel array within the window cover a region proximate to the interactive surface 24 such that image data read from the pixels within the window is sufficient to enable the position and characteristic of a pointer in proximity to the interactive surface 24 to be identified. As shown in FIG. 6, the window is defined by two inverted v-shaped boundary lines spaced apart by a constant distance or height H. The height H is selected to be a minimum of ten (10) pixel rows and a maximum of thirty-two (32) pixel rows. By only reading out image data from pixels of the pixel array within the window, the amount of image data that needs to be processed by subsequent operations is reduced and as a result, the processing power and memory requirements of the ASIC signal processing circuitry 72 are reduced.

In this embodiment, the master DSP 500 can be used to change the height H and shape of the window by altering the configuration data conveyed to the imaging assembly 60 during initialization. In particular, the configuration data defines three adjustable points A, B and C along the upper boundary line of the window with points A and C being at the ends of the upper boundary line and point B being at an intermediate position along the length of the upper boundary line.

The image data that is readout by the read-out control 74 is sent to the pre-processing circuit 76. The pre-processing circuit 76 comprises an analog-to-digital converter (ADC), an analog gain and linearizer and other components to perform pre-processing functions, such as analog-to-digital conversion, gain, linearization, dead/hot pixel correction, slope compensation, digital binning etc.

The sub-frame manager 78 receives pre-processed image data from the pre-processing circuit 76 and is responsible for keeping track of image data readout from acquired image frames that belong to the same image frame sequence. The sub-frame manager 78 redirects the pre-processed image data to either the primary sub-frame processor 80 or the secondary sub-frame processor 82 as appropriate.

Image data readout from the first two image frames in the image frame sequence is directed to the primary sub-frame processor 80. As the first image frame is acquired with the IR light source on and as the second image frame is acquired with the IR light source off, the primary sub-frame processor 80 uses the pre-processed image data from these image frames to remove ambient light artifacts that appear in both image frames by subtracting the pre-processed image data from the two image frames. The difference image data is then stored in the frame buffer 86a. Each pixel of the difference image data is an 8-bit monochrome value in the range of 0 to 255.

The background buffer 86b stores a background image that is dynamically updated when no pointers in acquired image frames have been detected. Significant differences between the difference image data in the frame buffer 86a and the background image in the background buffer 86b signify the presence of one or more pointers in acquired image frames.

The VIP and ROI processor 88 computes VIPs using the difference image data stored in the frame buffer 86a and using the background image stored in the background buffer 86b within an area defined by the bezel file stored in bezel map 208. During this procedure, two separate VIP calculations are carried out in parallel using the difference image data stored in the frame buffer 86a and one VIP calculation is carried out using the background image stored in the background buffer 86b.

During the first VIP calculation, using the difference image data stored in the frame buffer 86a, a VIP is calculated by summing the pixel intensity values along each pixel column and then normalizing the result by dividing the pixel intensity value sum for each pixel column by the corresponding number of pixel columns. Further specifics of this VIP calculation methodology are described in commonly assigned U.S. Patent Application Publication No. 2009/0277694 to Hansen et al. filed on May 9, 2008 and entitled "Interactive Input System and Bezel Therefor", the disclosure of which is incorporated herein by reference in its entity. A VIP is also calculated in the same manner using the background image stored in the background buffer 86b.

After the VIP and ROI processor 88 computes the VIPs using the difference image data in the frame buffer 86a and the background image in the background buffer 86b, the VIP and ROI processor 88 compares the two VIPs on a column by column basis to generate a first normalized VIP according to the following equation:

$$\text{Normalized } VIP = \frac{VIP_{frame}}{VIP_{background}} \quad (1)$$

Figure 7:
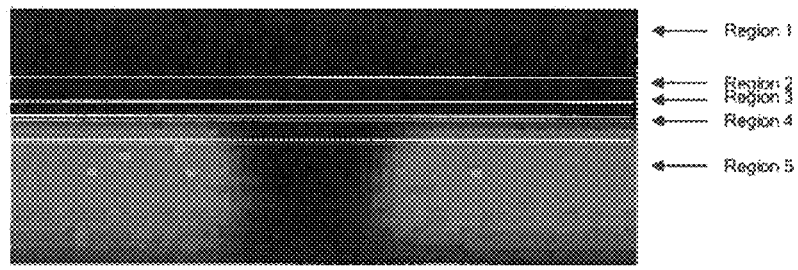
FIG. 7 is a portion of a difference image frame.
Figure 8:
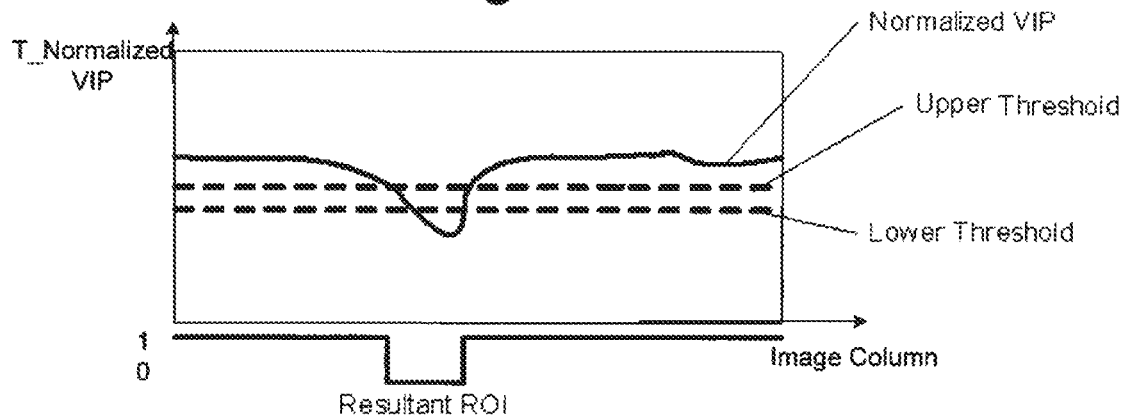
FIG. 8 is a graphical plot of a normalized vertical intensity profile (VIP) based on the difference image frame of FIG. 7 calculated using a first VIP method, and showing the resultant region of interest (ROI) of the normalized VIP.

The VIP and ROI processor 88 then compares the first normalized VIP against an upper threshold and a lower threshold. The result of this comparison is stored as a single bit per column. A zero "0" indicates the presence of a potential pointer and a one "1" indicates the absence of a pointer. A cluster of zeros forms a region of interest (ROI) and signifies the existence of a pointer. When a cluster of zeros is detected, the VIP and ROI processor 88 generates ROI data in the form of a vector comprising the consecutive columns having the zeros forming the ROI. The ROI data thus identifies the location of a pointer in the difference image data. Alternatively, the VIP and ROI processor 88 may generate ROI data in a different format such as for example by identifying the number of the starting column of the ROI, the number of the ending column of the ROI and the width of the ROI. FIG. 7 shows difference image data stored in the frame buffer 86a signifying the existence of a pointer. FIG. 8 shows the first normalized VIP generated using the difference image data of FIG. 7 and the existence of an ROI after comparing the first normalized VIP to the upper and lower thresholds.

Figure 9:
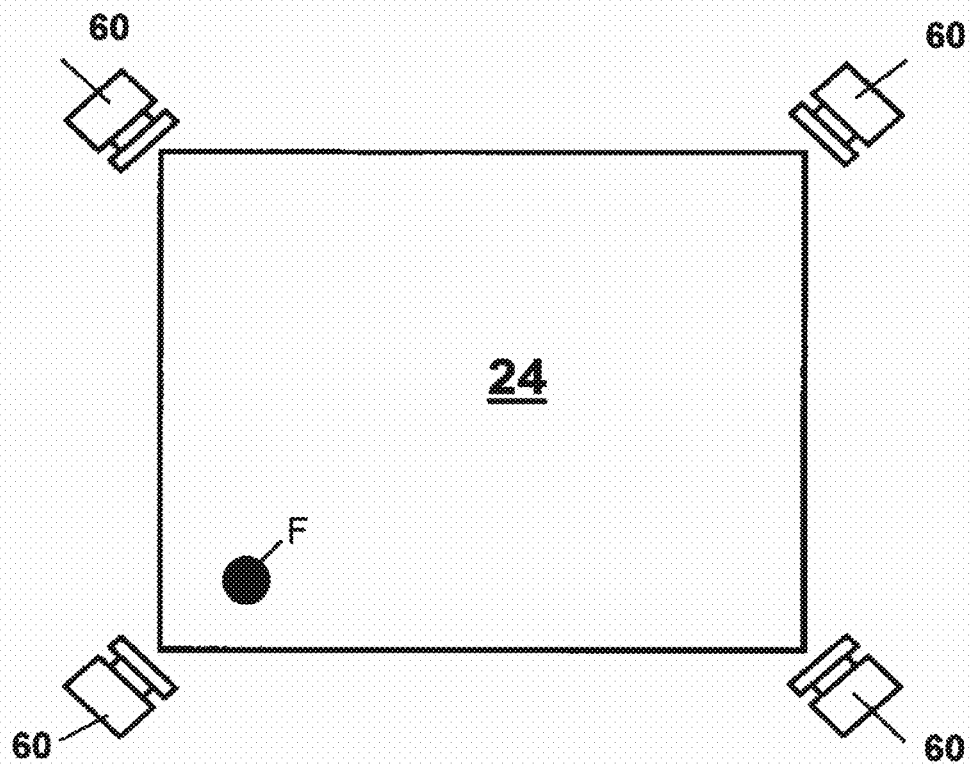
FIG. 9 is a front view of a portion of the interactive input system of FIG. 1 showing a finger in proximity with one of the imaging assemblies.
Figure 10:
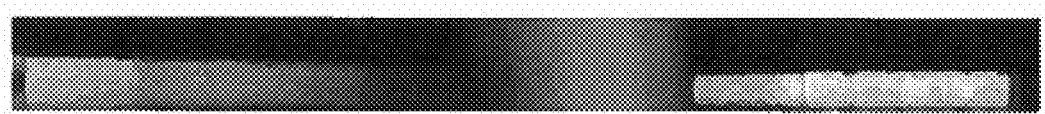
FIG. 10 is a difference image frame showing the finger that is in proximity with the imaging assembly.
Figure 11:
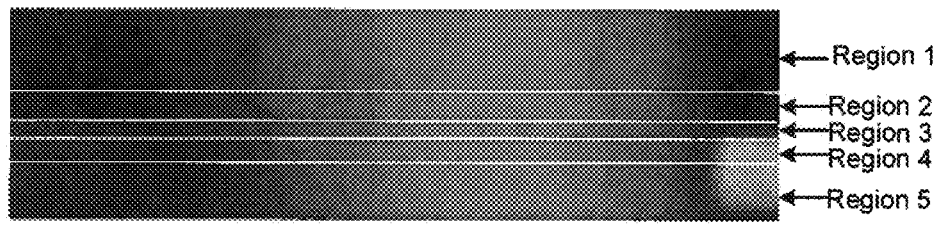
FIG. 11 is an enlarged portion of the difference image frame of FIG. 10.

Typically, when a passive pointer is in proximity with the interactive surface 24, the passive pointer occludes IR illumination reflected by the retro-reflective bands on the bezel segments and thus appears as a dark region interrupting a bright band as shown in FIG. 7. In some situations however, the passive pointer may appear as a bright region. For example as shown in FIG. 9, if a passive pointer such as a finger F is brought into proximity with the interactive surface 24 at a location close to one of the imaging assemblies 60, when the IR light source associated with that imaging assembly 60 is conditioned to the on state during image frame capture, IR illumination emitted by the IR light source may be reflected by the finger F towards the image sensor 70 resulting in the pointer appearing as a bright region in the image frame instead of a dark region as shown in FIG. 10. FIG. 11 is an enlarged portion of the image frame of FIG. 10 highlighting the bright region representing the finger. As can been seen in FIGS. 10 and 11, only the areas near the edges of the finger appear dark. Other areas including the central part of the finger appear relatively bright. The bright region obscures the bezel and the dark area above and below the bezel.

Figure 12A:
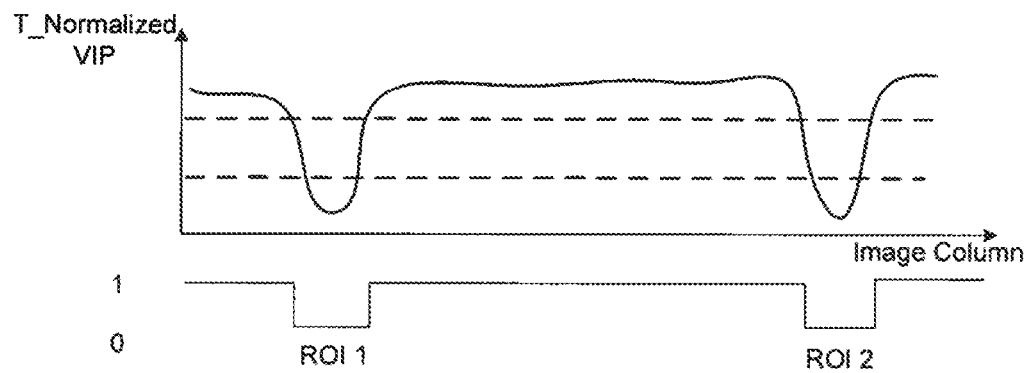
FIG. 12A is a graphical plot of a normalized VIP based on the difference image frame of FIG. 10 calculated using the first VIP method and showing resultant ROIs of the normalized VIP.

In this situation, the first VIP calculation method may return false pointer detection results. This is due to the fact that the pixels in the difference image data stored in the frame buffer 86a corresponding to the central part of the finger have values close to the average values of pixels representing the bezel (for example, 50% shade or a grey level of 128). As a result, when the first normalized VIP is calculated, the bits in the columns of the first normalized VIP corresponding to the central part of the finger have values equal to one (1) signifying no pointer. Only the bits in the columns of the first normalized VIP corresponding to the areas near the two edges of the finger have values equal to zero (0). Thus, when the first normalized VIP is compared to the upper and lower thresholds, two ROIs are detected signifying the existence of two pointers resulting in false pointer detection as shown in FIG. 12A.

In order to avoid this result, the second VIP calculation is carried out by the VIP and ROI processor 88. During the second VIP calculation method, the bezel file in the bezel map 208 is used to define points that allow the difference image data stored in the frame buffer 86a to be partitioned into multiple regions. In this embodiment, the bezel file allows the difference image data to be partitioned into five (5) regions as shown in FIGS. 7 and 11. It will be appreciated by those skilled in the art that more than five (5) regions can be defined. Region 1 comprises dark pixels that are above the bezel. The height of region 2 is three (3) pixels and this region also comprises dark pixels. Region 3 is a transition region between pixels that are above the bezel and pixels that are within the bezel. Region 4 is also three (3) pixels high and comprises pixels that are within the bezel. Region 5 comprises pixels that are within the bezel and that represent the reflection of the bezel appearing on the interactive surface 24 as seen by the imaging assembly 60. The VIP and ROI processor 88 is configured to consider only the region near the bezel in the second VIP calculation.

During the second VIP calculation, using the difference image data stored in the frame buffer 86a, the pixel values in region 2 are subtracted from the pixel values in region 4. The result is then divided by the total number of pixel rows in region 2 or in region 4 to yield a second VIP as expressed by:

$$M_{VIP} = \frac{\text{pixels in region 4} \cdot \text{pixels in region 2}}{\text{rows in region 4 (or region 2)}} \quad (2)$$

A second normalized VIP is then determined by comparing the second VIP with the first VIP that was computed using the background image in the background buffer 86b on a column by column basis according to:

$$M_{\square\square Normalized}VIP = \frac{M_{VIP_{frame}}}{VIP_{background}} \quad (3)$$

Following this, using the difference image data in the frame buffer 86a, another VIP is calculated by adding the pixel values in region 4 and region 5, and then dividing the result by the total number of pixel rows in region 4 and region 5, as expressed by:

$$T_{VIP} = \frac{\text{pixels in region 4} + \text{pixels in region 5}}{\text{rows in region 4 and region 5}} \quad (4)$$

A normalized VIP is then determined by comparing this VIP with the first VIP that was computed using the background image in the background buffer 86b on a column by column basis to generate a normalized VIP according to:

$$T_{Normalized}VIP = \frac{T_{VIP_{frame}}}{VIP_{background}} \quad (5)$$

Figure 12B:
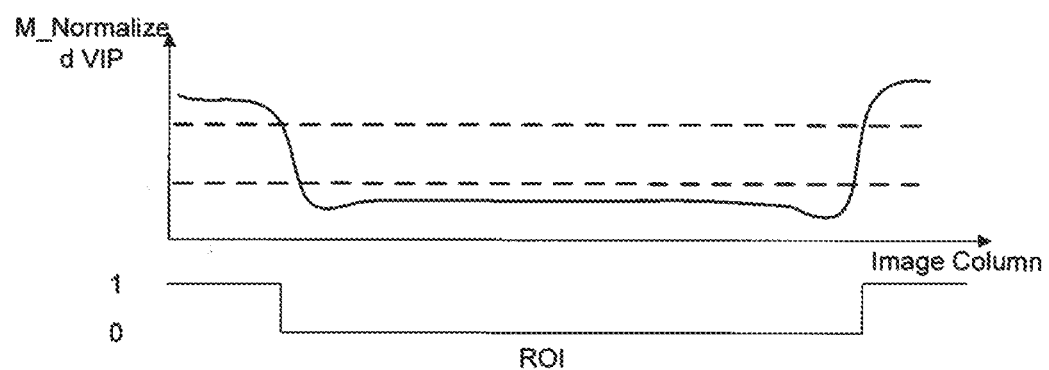
FIG. 12B is a graphical plot of another normalized VIP based on the difference image frame of FIG. 10 calculated using a second VIP method and showing the resultant ROI of the normalized VIP.

The VIP and ROI processor 88 then combines the two normalized VIPs, compares the result to the upper and lower thresholds and stores the result of the comparison as a single bit per column. A pointer is determined to exist in image frame data if either of the two normalized VIPs is below the lower threshold. When using the second VIP calculation method, the pixel values in region 2 are subtracted from the pixel values of region 4, which results in average pixel values equal to zero (0). The second normalized VIP which is defined by equation (5) is also close to zero (0) in the central part of the finger. Meanwhile the dark areas near the two edges of the finger also have normalized VIP values close to zero (0). As a result, only one ROI is generated when the combined normalized VIPs are compared to the upper and lower thresholds as shown in FIG. 12B.

When a pointer is in proximity with the interactive surface 24 at a location spaced from the imaging assemblies 60, thus avoiding the situation discussed with reference to FIGS. 10 and 11, the result of second normalized VIP calculation is approximately the same as the result of the first normalized VIP calculation. As a result, the ROI data generated from each normalized VIP calculation is the same.

Once the ROI data has been generated from each normalized VIP calculation, the VIP and ROI processor 88 combines the ROI data and conveys the ROI data to the image processor 92. The image processor 92 also receives the difference image data in the frame buffer 86a and background image in the background buffer 86b.

The secondary sub-frame processor 82 receives and processes the third to tenth image frames of the image frame sequence to detect the identity of an active pointer being used to interact with the interactive surface 24 if the active pointer is of the type that modulates its emitted IR illumination at a modulation frequency unique to the active pointer. In particular, the secondary sub-frame processor 82 sums all pixels in a region of interest of the eight image frames and incorporates shift logic to produce a light intensity variation if the image frames comprise modulated bright regions. A Fourier Transform is then performed on the light intensity variation to yield a frequency domain representation of the light intensity variation if it exists. As will be appreciated, if a passive pointer is being used to interact with the interactive surface 24, no light intensity variation is generated as each of these image frames will be dark. If however, such an active pointer is being used to interact with the interactive surface 24, the identity of the active pointer can be determined from the light intensity variation knowing its corresponding modulation frequency. Further specifics concerning the active pointer identification method are described in commonly assigned U.S. Patent Application Publication No. 2011/0242060 to McGibney et al., entitled "Interactive Input System and Information Input Method Therefor", filed on Apr. 1, 2010, the disclosure of which is incorporated herein by reference in its entirety. The secondary sub-frame processor 82 provides the image frames and the active pointer identification information, if it exists, to the image processor 92.

The image processor 92 counts the total number of ROIs that exist in the ROI data and in this embodiment, the image processor 92 is configured to detect up to ten (10) ROIs. However, it will be appreciated by those skilled in art that fewer or more than ten (10) ROIs may be supported depending on interactive input system requirements. The image processor 92 mainly performs data compression and normalization. The difference image data received from the frame buffer 96a, the background image received from the background buffer 86b and the image frames received from the secondary sub-frame processor 82 are normalized by dividing the difference image data and the image frames by the background image. If the total of the normalized image data and the ROI data exceeds the bandwidth allowed by the bi-directional serial interface 200, the image processor 92 compresses the ROI data. In particular, the ROIs are compressed in order from biggest to smallest until the total bandwidth is below the maximum limit of the bi-directional serial interface 200. Compression of the ROI data is done by averaging adjacent column data. If a compression ratio of 2:1 is employed, ROI data with 32 rows and 100 columns wide will be compressed to 32 rows and 50 columns. Different compression ratios, for example 4:1 etc. can of course be used. The amount of ROI data that is processed is configurable. In this embodiment, the range for the ROI data size is 64 to 512 columns with a step size of 64 columns.

The data formatter 96 receives the normalized image data, the compressed ROI data and the active pointer ID, if an active pointer is being used to interact with the interactive surface 24, from the image processor 92 and transmits the data in a fixed format as a serial stream over the bi-directional serial interface 200 to the master controller 50. An exemplary format is shown in Table 1 below:

TABLE 1

|  | Data length | Number of 16 bit words |
|---|---|---|
| Header start | 16 | 2 |
| ROI Status | 16 | 1 |
| ROI descriptors | 16 | 10 * 4 = 40 |
| header checksum | 16 | 1 |
| header checksum complement | 16 | 1 |
| VIP_COLUMNS | 12 | 1024 |
| ROI_IMAGEs | 8 | 512 * 32 * 0.5 = 8192 |
| SUBFRAME_SCALE FACTORS | 15 | 2 |
| SUBFRAME_0_SUMS | 16 | 10 |
| SUBFRAME_1_SUMS | 16 | 10 |
| SUBFRAME_2_SUMS | 16 | 10 |
| SUBFRAME_3_SUMS | 16 | 10 |
| SUBFRAME_4_SUMS | 16 | 10 |
| SUBFRAME_5_SUMS | 16 | 10 |
| SUBFRAME_6_SUMS | 16 | 10 |
| SUBFRAME_7_SUMS | 16 | 10 |
| Status | 16 | 1 |
| Checksum | 16 | 1 |

The image data concentrator 300 receives the data transmitted by the data formatter 96 of each imaging assembly 60 and combines the data into a single data stream that is delivered to the image DSP 400 via parallel port PPI. The image DSP 400 processes the data stream received from the image data concentrator 300 to eliminate false pointer targets. The image DSP 400 also processes the data stream received from the image data concentrator 300 to determine pointer contact status, pointer boundaries, etc. and to synthesize image data into pointer angles.

The master DSP 500 receives the pointer angles and pointer contact status information from the image DSP 400 and triangulates the pointer angles to determine the position of the pointer in (x,y) coordinates of the interactive surface 24. The pointer coordinates and pointer contact status information are then conveyed to the general purpose computing data 28 via the USB cable 30.

Although the image data concentrator 300 has been described as being implemented on a field programmable gate array, those of skill in the art will appreciate that the image data concentrator may take other forms. For example, the image data concentrator 300 may be embodied in a complex programmable logic device (CPLD) or other suitable device.

Figure 14:
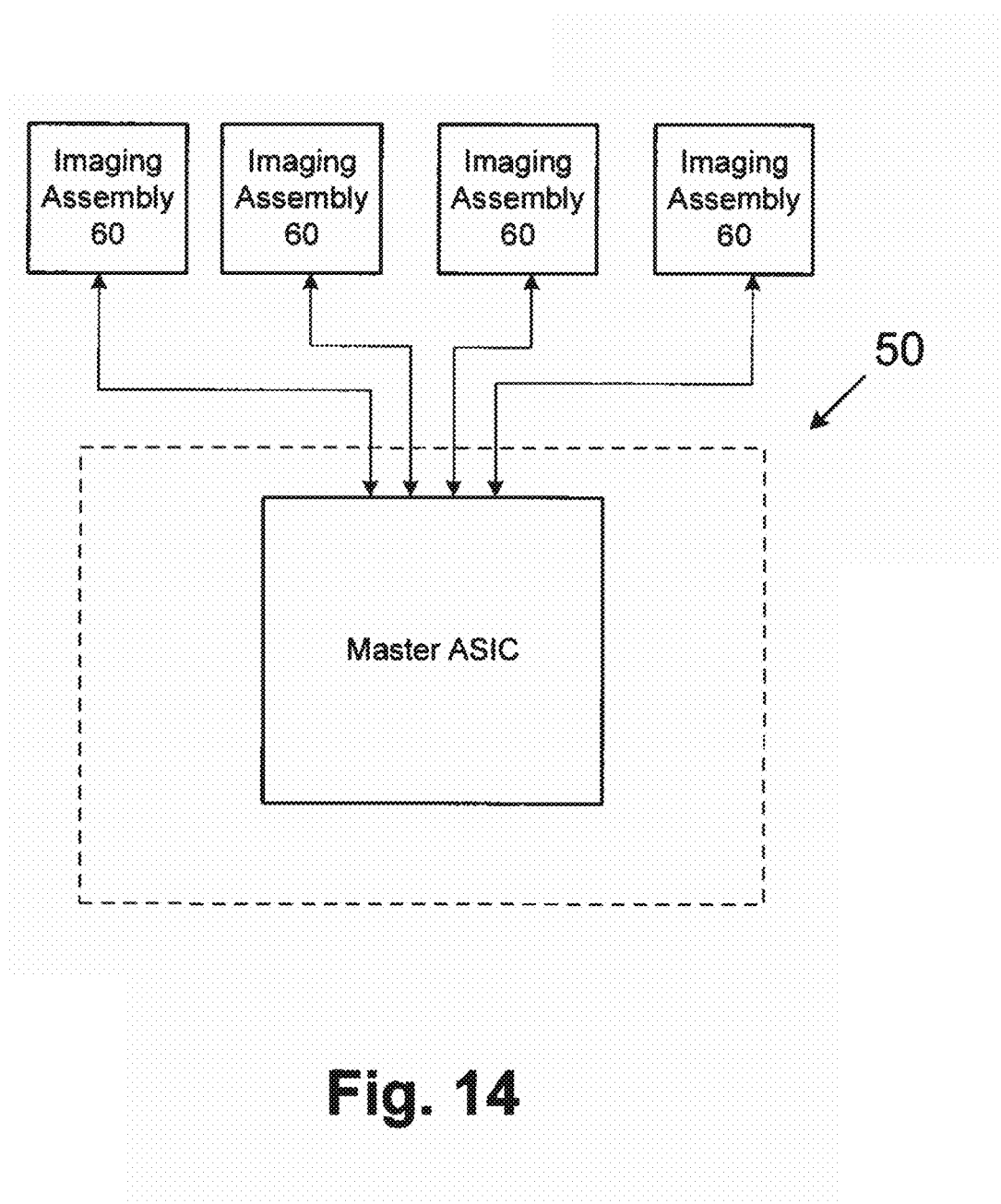
FIG. 14 is a block diagram showing an alternative master controller for use in the interactive input system of FIG. 1.
Figure 15:
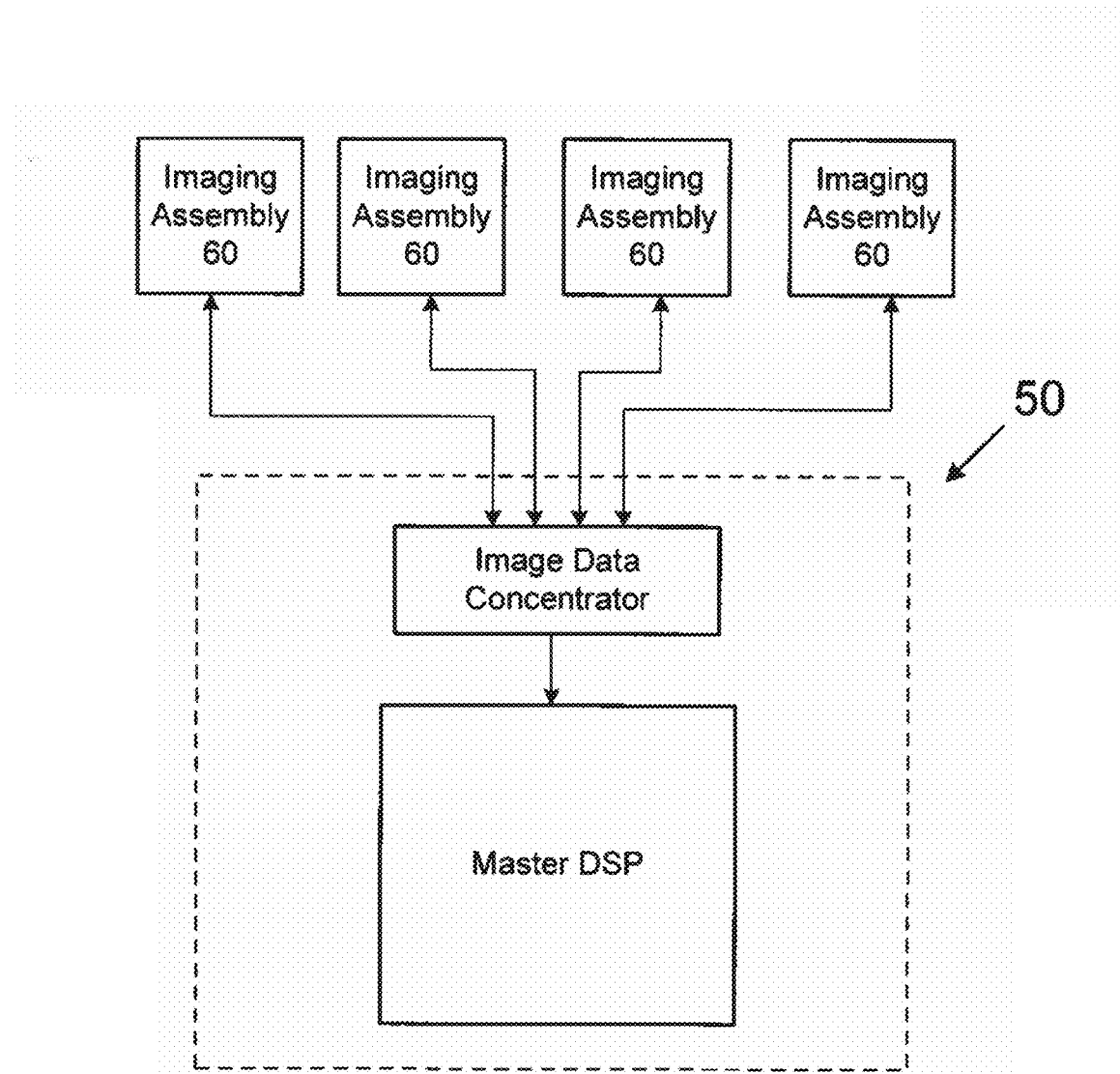
FIG. 15 is a block diagram showing yet another alternative master controller for use in the interactive input system of FIG. 1.

Although the master controller 50 has been described as comprising an image DSP and a separate master DSP, other master controller configurations are possible. For example, as shown in FIG. 14, the master controller 50 may comprise a single ASIC that performs the functions of the image data concentrator and image and the master DSPs. Alternatively as shown in FIG. 15, the functions of the image DSP and the master DSP may be combined and performed by a single DSP.

In the embodiments described above, the interactive board 22 is described as being mounted on a vertical support surface. As will be appreciated, the interactive board 22 may alternatively be supported in a vertical orientation by a stand or may be suspended from a ceiling surface or other overhead structure. Rather than employing an overhead short throw projector, a projector mounted on a boom extending from the support surface or a rear projection device may be employed to project the image on the interactive surface 24. Alternatively, the interactive board 22 may be placed in front of or embody a flat panel display device such as for example, a liquid crystal display (LCD) or plasma television on which the image is presented. The interactive board 22 may alternatively be placed in a horizontal orientation and form part of an interactive touch table.

Although embodiments have been described with reference to the drawings, those of skill in the art will appreciate that variations and modifications may be made with departing from the scope thereof as defined by the appended claims.

What is claimed is:

1. An interactive input system comprising:
at least two imaging assemblies capturing image frames of a region of interest wherein the at least two imaging assemblies capturing images from different vantages, each imaging assembly comprising an image sensor and signal processing circuitry implemented on an application specific integrated circuit (ASIC), image data acquired by said image sensor being pre-processed by said signal processing circuitry; and
processing structure processing pre-processed image data output by said imaging assemblies to determine a location of at least one pointer within the region of interest.

2. The interactive input system of claim 1 wherein said processing structure comprises at least one digital signal processor.

3. The interactive input system of claim 2 wherein said processing structure further comprises an image data concentrator, said image data concentrator combining pre-processed image data received from said imaging assemblies into an image data stream and communicating the image data stream to said at least one digital signal processor.

4. The interactive input system of claim 3 wherein said image data concentrator is implemented on a field programmable gate array.

5. The interactive input system of claim 2 wherein said processing structure comprises a plurality of digital signal processors.

6. The interactive input system of claim 5 wherein one of the plurality of digital signal processors processes the pre-processed image data to generate pointer data and wherein another of the plurality of digital signal processors receives the pointer data from the one digital signal processor and triangulates the pointer data to determine location of the at least one pointer in (x,y) coordinates relative to an interactive surface.

7. The interactive input system of claim 6 wherein the one digital signal processor processes the pre-processed image data at least to determine pointer contact status and pointer boundaries.

8. The interactive input system of claim 7 wherein the one digital signal processor further processes the pre-processed image data to remove false pointer contact data.

9. The interactive input system of claim 6 wherein said processing structure further comprises an image data concentrator, said image data concentrator combining pre-processed image data received from said imaging assemblies into an image data stream and communicating the image data stream to said one digital signal processor.

10. The interactive input system of claim 9 wherein said image data concentrator is implemented on a field programmable gate array.

11. The interactive input system of claim 1 wherein each imaging assembly captures image frames in an image frame sequence and wherein said signal processing circuitry processes the image frames of the image frame sequence thereby to generate the pre-processed image data.

12. The interactive input system of claim 11 wherein said signal processing circuitry processes image frames to remove ambient light artifacts.

13. The interactive input system of claim 11 wherein said signal processing circuitry processes image frames to identify regions of interest therein representing potential pointers.

14. The interactive input system of claim 11 wherein said signal processing circuitry processes image frames to determine the identity of an active pointer.

15. The interactive input system of claim 13 wherein said signal processing circuitry identifies the regions of interest by performing at least one vertical intensity profile calculation and comparing the results with threshold data.

16. The interactive input system of claim 15 wherein said signal processing circuitry identifies the regions of interest by performing a plurality of vertical intensity profile calculations and comparing the results with threshold data.

17. The interactive input system of claim 16 wherein said signal processing circuitry performs the vertical intensity profile calculations in parallel.

18. The interactive input system of claim 17 wherein the image frame sequence comprises one image frame captured when the region of interest is flooded with illumination and a plurality of image frames captured in the absence of the illumination, said signal processing circuitry generating difference image data using said one image frame and a background image captured in the absence of the illumination and performing the vertical intensity profile calculations using the difference image data and the background image.

19. The interactive input system of claim 18 wherein said signal processing circuitry processes the plurality of image frames captured in the absence of the illumination to identify an active pointer.

20. The interactive input system of claim 1 wherein said processing structure is configured to provide configuration data to said imaging assemblies.

21. The interactive input system of claim 20 wherein said configuration data specifies a window of pixels in said captured image frames forming said image data to be pre-processed.

22. The interactive input system of claim 21 wherein said configuration data is modifiable to adjust the shape of said window.

23. The interactive input system of claim 21 further comprising a bezel generally surrounding said region of interest that is in the fields of view of said imaging assemblies and wherein said window has a shape generally conforming to the shape of said bezel as it appears in said captured image frames.

24. The interactive input system of claim 23 wherein said window has a shape generally resembling a chevron.

25. The interactive input system of claim 21 wherein said window has a dimension in the range of about ten to about thirty-two pixel rows.

26. An imaging assembly for an interactive input system comprising:
an image sensor having a field of view looking into a region of interest; and
processing circuitry receiving image data acquired by said image sensor and processing the image data, wherein said image sensor and processing circuitry are implemented on an application specific integrated circuit (ASIC);
wherein said imaging assembly is configured to capture image frames in an image frame sequence and wherein said processing circuitry processes the image frames of the image frame sequence to identify regions of interest therein representing potential pointers by performing a plurality of vertical intensity profile calculations in parallel and comparing the results with threshold data; and, the image frame sequence comprises one image frame captured when the region of interest is flooded with illumination and a plurality of image frames captured in the absence of the illumination, said processing circuitry generating difference image data using said one image frame and a background image captured in the absence of the illumination and performing the vertical intensity profile calculations using the difference image data and the background image.

27. The imaging assembly of claim 26 wherein said processing circuitry processes a pair of image frames of said sequence to remove ambient light artifacts.

28. The imaging assembly of claim 26 wherein said processing circuitry processes image frames to determine the identity of an active pointer.

29. The imaging assembly of claim 26 further comprising a bezel map storing configuration data.

30. The imaging assembly of claim 29 wherein said configuration data specifies a window of pixels of said captured image frames forming said image data.

31. The imaging assembly of claim 30 wherein said configuration data is modifiable to adjust the shape of said window.

32. The imaging assembly of claim 30 wherein said window has a shape generally conforming to the shape of a bezel surrounding said region of interest as it appears in said captured image frames.

33. The imaging assembly of claim 32 wherein said window has a shape generally resembling a chevron.

34. The imaging assembly of claim 30 wherein said window has a dimension in the range of about ten to about thirty-two pixel rows.

35. An interactive input system comprising:
at least two imaging assemblies having fields of view encompassing a region of interest wherein the at least two imaging assemblies capturing images from different vantages, each imaging assembly capturing a sequence of image frames, one image frame being captured when the region of interest is flooded with illumination and a plurality of image frames being captured in the absence of the illumination, each imaging assembly having signal processing circuitry generating difference image data using said one image frame and a background image frame captured in the absence of the illumination and performing vertical intensity calculations using the difference image data and the background image thereby to identify one or more potential pointers; and processing structure processing the output of said imaging assemblies to determine a location of each pointer within the region of interest.

36. The interactive input system of claim 35 wherein said signal processing circuitry processes the plurality of image frames captured in the absence of the illumination to identify an active pointer.

37. An interactive input system comprising:

at least two imaging assemblies capturing image frames of a region of interest that is surrounding by bezel segments from different vantages, each imaging assembly processing image data within a window of the captured image frames, the window having a shape generally conforming to the shape of a bezel including the bezel segments as it appears in the captured image frames; and processing structure processing the image data output by the imaging assemblies to determine a location of at least one pointer within the region of interest.

38. The interactive input system of claim 37 wherein said window is modifiable to adjust the shape thereof.

39. The interactive input system of claim 38 wherein said window has a shape generally resembling a chevron.

40. The interactive input system of claim 37 wherein said window has a dimension in the range of about ten to about thirty-two pixel rows.

41. An imaging assembly for an interactive input system comprising:

an image sensor having a field of view looking into a region of interest; and processing circuitry processing a sequence of image frames captured by the image sensor, one image frame being captured when the region of interest is flooded with backlight illumination and a plurality of image frames being captured in the absence of the backlight illumination, said processing circuitry generating difference image data using said one image frame and a background image captured in the absence of the backlight illumination and performing vertical intensity profile calculations using the difference image data and the background image thereby to identify one or more potential pointers in the image frames.

* * * * *